Jan. 12, 1971 J. A. HAENER 3,555,142
CENTRIFUGAL METHOD FOR PRODUCING HOLLOW
AXIALLY SYMMETRIC BODIES
Filed Jan. 8, 1969 3 Sheets-Sheet 1
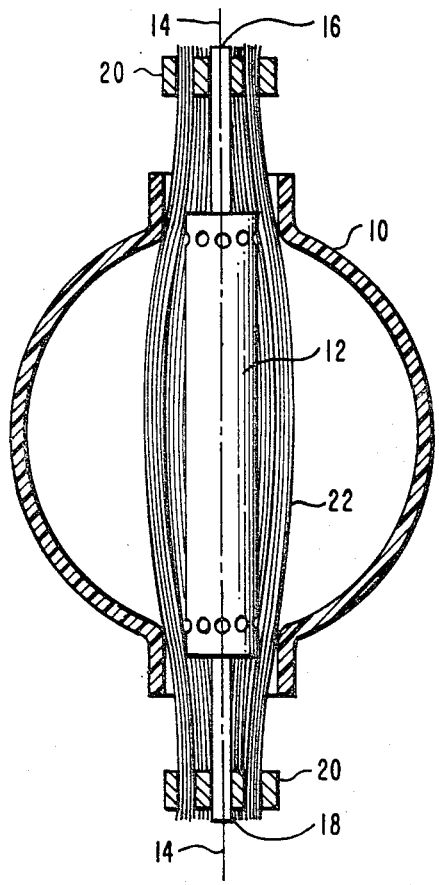
FIG.—1A
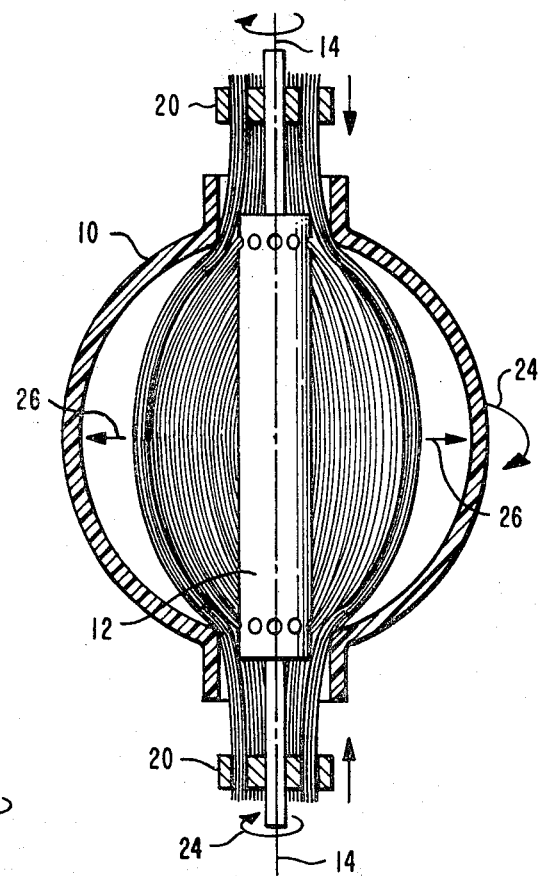
FIG.—1B
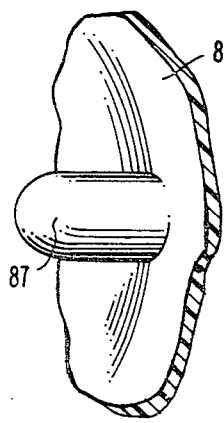
FIG.—5
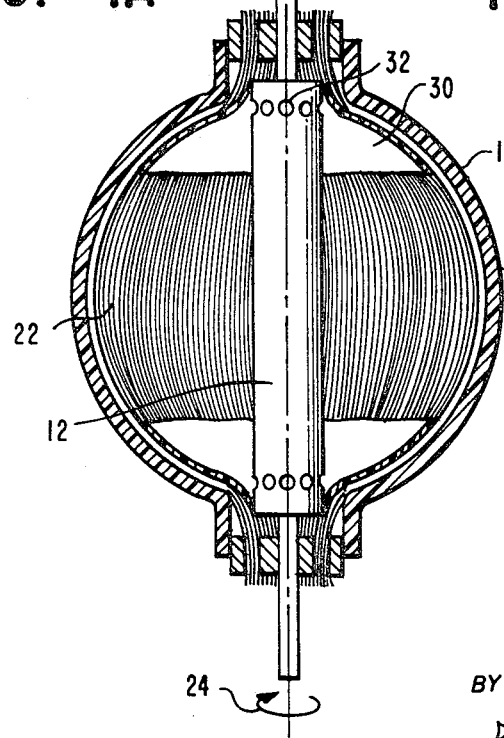
FIG.—1C
FIG.—6
INVENTOR
JUAN A. HAENER
BY
Fraser and Bogucki
ATTORNEYS INVENTOR
JUAN A. HAENER
BY
Fraser and Bogucki
ATTORNEYS FIG.–3
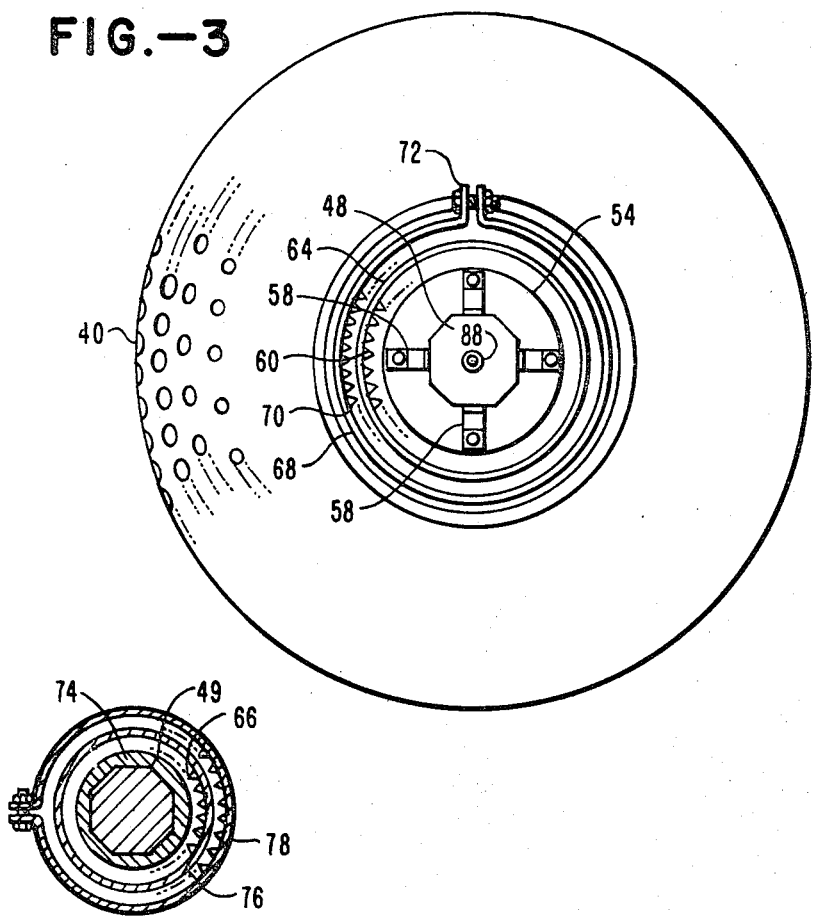
FIG.–4
FIG.–7
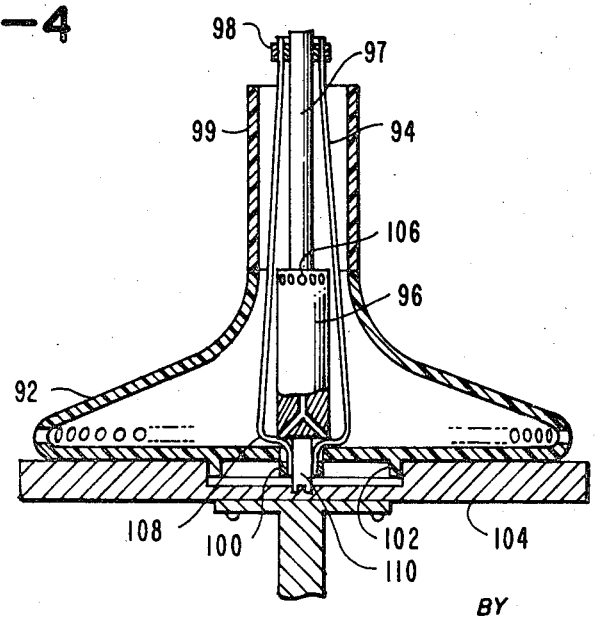
INVENTOR
JUAN A. HAENER
BY
Fraser and Bogucki
ATTORNEYS Patented Jan. 12, 1971

United States Patent Office 3,555,142

3,555,142
CENTRIFUGAL METHOD FOR PRODUCING HOLLOW AXIALLY SYMMETRIC BODIES

Juan A. Haener, San Diego, Calif., assignor to Whittaker Corporation, Los Angeles, Calif., a corporation of California
Filed Jan. 8, 1969, Ser. No. 789,717
Int. Cl. B28b 1/20; B29c 5/04
U.S. Cl. 264—311                    6 Claims

ABSTRACT OF THE DISCLOSURE

The desired generally axially symmetric shape of a hollow body is defined by interior walls of a mold structure mounted for rotation about a vertical spin axis. Fiber strands are uniformly distributed about the spin axis to extend through the mold with the opposite ends slidably engaged to move along the mandrel towards one another. The entire assembly is spun to move the fiber strands within the mold radially outward by centrifugal force toward the interior mold walls, gradually sliding the fiber ends together to release additional fiber lengths into the mold. When the fibers lie against the interior mold surfaces, a liquid binder is released to flow radially outward by centrifugal force coating the fibers covering the interior mold surfaces. The binder hardens during continued spinning, binding the fibers together to form a fiber reinforced hollow body of the desired shape.

BACKGROUND OF THE INVENTION (1) Field of the invention

This invention relates to the manufacture of generally axially symmetric hollow articles using composite materials containing reinforcing fibers aligned with a predetermined orientation in a solidified binder.

(2) Description of prior art

An increasing number of articles are being made of composite materials consisting of reinforcing fibers held in a binder matrix. In such materials, the reinforcing fibers provide considerable tensile strength along their length so that the structures are better able to resist certain loads.

Obtaining the proper orientation and distribution of fibers in most solid structures, such as composite material sheets, is relatively easy since the fibers can merely be held in place while the binder material is applied and set. However, the fabrication of hollow structures using such materials, particularly those with varying diameters, is much more difficult. In the past, some cylindrical hollow pipes had been constructed of composite materials using techniques employing centrifugal forces. For example, a cylindrical mold having the desired pipe diameter is spun at high speed to move the fibers and liquid binder within the mold toward the inner periphery until the binder was hardened. However, these prior methods resulted in a random fiber orientation and distribution in the pipe walls, and were not suitable for the construction of irregularly shaped hollow articles with varying diameters. As a consequence, filament winding techniques have been used in making these shapes, but this process is relatively expensive and does not lend itself to economical mass production by continuous flow manufacturing processes.

SUMMARY OF THE INVENTION

A mold with interior walls defining the desired generally axially symmetric shape of a hollow body to be produced is mounted for spinning about a vertical axis. A mandrel is centrally located along the spin axis and extends through enlarged coaxial openings at the top and bottom of the mold. Elongated fiber strands are uniformly distributed about the mandrel to extend along its length through the top and bottom openings and are held at each end in a clamping arrangement that is slidably attached on the mandrel above and below the mold. The entire assembly is spun at high speed causing the elongated fiber strands within the mold to move radially outward due to centrifugal forces and pull the clamping arrangements along the mandrel moving the clamped ends of the fibers toward one another. When the fibers within the mold lie against the interior surfaces of the mold, a liquid binder is released through openings in the mandrel to be directed outward by centrifugal force, coating the fibers covering the interior mold surfaces. The spinning is continued until the liquid binder hardens to bind the fibers in place forming the axially symmetric body of the desired shape and fiber orientation.

In a preferred version, the desired number of fiber strands are dispensed in a continuous bundle from a bobbin to be uniformly distributed about the mandrel and engaged at each end in an annular clamping collar at opposite ends of the mandrel. The length of the fiber strands between the collar attachments at each end is selected to correspond to the length of the path measured along the interior surface of the mold between the top and the bottom openings. At least one, or preferably both, of the collar attachments are slidable along the mandrel toward the adjacent openings in the mold. Initially, the collars are separated so that the fiber strands are fully extended, but as the centrifugal force moves the fibers within the mold outward, the slidable clamping collar attachments are drawn toward one another to release additional fiber lengths within the mold. In making hollow isotensoid shaped bodies or the like, the liquid binder is injected through closely spaced radial nozzle openings around the surface of the mandrel immediately inside the top and bottom openings to flow radially outward over the fibers lying against the interior mold surface.

In accordance with other aspects, vent holes through the walls may be arranged in a preselected pattern depending on the mold shape to release liquid binder from the mold that would otherwise tend to accumulate in the outermost or innermost portions, depending on the specific density relation of both materials. The size and spacing of the holes may be varied in particular areas to control the thickness of the body. Also fibers and binder liquids with different specific gravities may be employed to vary the radial position and density of the fibers by controlling the spin rate during setting. The fibers may be arranged in helical patterns by rotating one collar attachment relative to the other to impart twist to the fibers, and the strength of the finished body may be increased by arranging the fibers in a criss cross pattern in which successive layers are arranged with opposite helical twists. This may also be accomplished by employing a clamping collar arrangement capable of separately engaging two or more coaxially arranged fiber bundles to be twisted in opposite directions, or in some cases simply by forming successive layers with the fibers twisted in opposite directions, each additional layer being separately formed on the interior of the previous layer after it has hardened sufficiently. Molds having interior walls slightly variant from axial symmetry may be used, forming bodies having like characteristics.

SUMMARY OF THE DRAWINGS

FIGS. 1A, 1B and 1C illustrate schematically sucessive stages in the fabrication of a hollow symmetrical, fiber reinforced article in accordance with the invention, showing the initial placement of the fibers, spinning to move the fibers outward, and coating of the fibers with the liquid binder to form the finished article;

FIG. 3 is a full top view of the arrangement shown in FIG. 2;

FIG. 4 is a full sectional view taken along the line 4—4 of FIG. 2;

FIG. 5 is a perspective view of a broken away portion of a mold structure to be used in accordance with the invention for producing a symmetrically shaped, fiber reinforced article having a hole or port opening extending through one of the side walls;

FIG. 6 is a perspective view of the side wall portion containing the hole or port opening resulting from use of the mold illustrated in FIG. 5, with the fiber orientation shown schematically; and, FIG. 7 shows an alternative arrangement for use in fabricating a fiber reinforced article having a particular axially symmetric shape.

DETAILED DESCRIPTION

Figure 2:
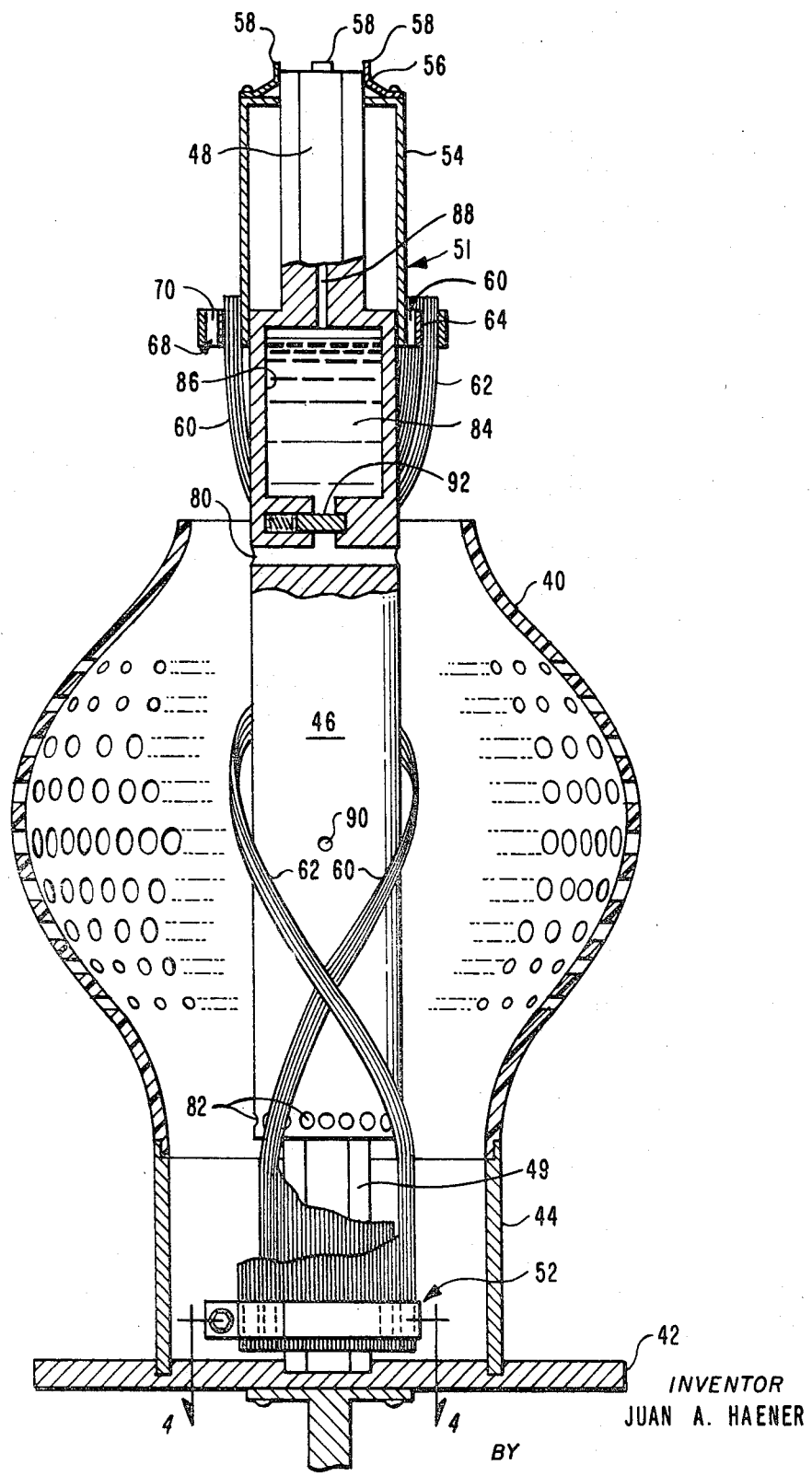
FIG. 2 is an elevational view of an arrangement in accordance with the invention with portions broken away in section.

Referring to FIGS. 1A, 1B and 1C, which illustrate schematically the basic principles of the invention showing successive steps involved in the practice of the invention, the desired shape of the axially symmetric body to be formed is defined within the interior walls of a hollow mold structure 10 that defines a plenum chamber surrounding a central mandrel 12. The mold structure 10 is mounted concentrically with the mandrel 14 for rotation about a central spin axis 14 by means (not shown) such as a turntable driven by a variable speed spin motor. The mandrel 12 has upper and lower extensions 16 and 18, respectively, that extend through upper and lower central openings in the mold structure. A collar arrangement 20 is mounted on each end of the mandrel 12 to enage fibers 22 at opposite ends of the mold structure 10. The fibers are uniformly distributed in the collar 20 about the central mandrel 12 to extend longitudinally along it through the top and bottom openings in the intermediate plenum chamber defined by the interior walls of the mold structure 10.

In the particular arrangement illustrated in these figures, the ends of the fibers 22 are tightly held in upper and lower collars 20 that are slidably engaged on the upper and lower mandrel extensions 16 and 18. Initially, the fibers 22, which may be dispensed in a bundle from a bobbin (not shown) and cut to the desired length, are held at either end in the collars 20 that are separated the maximum distance from one another with the upper collar near the top of the mandrel extension 16 and the lower one near the bottom of the lower mandrel extension 18. With the system at rest, the friction between the interior surface of the collars 20 and the outer surface of the mandrel extensions 16 and 18 is sufficient to maintain the collars in their initial positions.

With the fibers thus secured in place, the entire assembly is rotated on a turntable or the like at high speed about the spin axis 14 in either direction, with the clockwise spin shown by the arrows 24 in FIG. 1B being arbitrarily selected for illustration purposes. As the speed of the turntable or other rotation means is increased, the portion of the fibers between the collars 20 move radially outward in the direction shown by the arrows 26 towards the interior walls of the mold structure 10 due to the centrifugal force. The force is transmitted along the length of the fibers 22 through the upper and lower mold openings to pull the collars 20 towards one another by sliding them inwardly against the frictional restraint along the mandrel extensions 16 and 18 in the direction shown by the arrows 28. As the collars 20 move together, additional fiber lengths are gradually drawn inward through the top and bottom mold openings so that the fibers bow outwardly within the plenum chamber defined by the mold structure 10, as shown in FIG. 1B. Further outward radial displacement of the bowed fibers increases the centrifugal force pulling the collars 20 gradually closer to release more of the fibers into the interior chamber. This continues until the fibers 22 lie against the inner walls of the mold structure 10, at which time the force on the fibers is released since they are radially supported by the interior walls. When this happens, the collars 20 are no longer pulled towards one another along the upper and lower mandrel extensions 16 and 18. Thus the fibers 22 are cut to a length sufficient to extend the distance between the collars 20 measured along the interior surfaces of the mold structure.

With the fibers 22 held against the interior walls of the mold structure 10 by centrifugal force, a liquid binder 30 is injected into the plenum chamber, such as from nozzle holes 32 disposed about the mandrel 12 that are located adjacent the upper and lower body structure openings. The liquid binder emerging from the holes 32 is directed radially outwardly by centrifugal force toward the adjacent interior wall surfaces of the mold structure 10. The liquid binder 30 is preferably applied initially to those portions of the interior walls closest to the axis of rotation so that the excess flows outwardly along the walls by centrifugal force to coat the fibers as the liquid moves towards the surface areas of greater radial displacement. After the liquid binder 30 is released, rotation speed is maintained until the liquid binder has hardened with the fibers in place to form a unitary structure of fiber reinforced material.

The simplified schematic illustrations of FIGS. 1A, 1B and 1C illustrate the formation of a symmetrical hollow body of generally rounded shape wherein the fibers in the finished article each extend axially in vertical planes passing through the spin axis 14. This axial alignment of the fibers tends to resist tensile stresses applied only in the axial direction parallel to the fiber orientation, but the fibers are unable to resist circumferentially applied tensile stresses transverse to their direction of orientation. However depending upon the direction of the stresses to be encountered in the use of the finished body, the method of this invention permits the fibers to be selectively aligned by twisting about the mandrel 12 to resist tensile forces in any desired direction. For example, multidirectional resistance to tensile forces can be achieved by twisting fibers in successive layers in different directions to produce a crisscross fiber pattern within the finished article. This may be accomplished either by forming the body in successive layers with each adjacent layer being formed within the preceding layer with the fibers twisted in the opposite direction, or preferably by employing an arrangement such as shown in FIG. 2 wherein the slidable collar assemblies are capable of holding two or more concentric fiber bundles having opposite twists.

Referring to FIGS. 2, 3 and 4, which schematically illustrate a preferred arrangement for providing a cross fiber orientation during a single operation, a mold structure 40 defining the shape of the finished article is mounted for rotation with a turntable 42 and has its lower edge engaged in a cylindrical retaining sleeve 44 attached to the turntable platform. A central mandrel 46 is centrally mounted within the mold along the turntable spin axis and has upper and lower extensions 48 and 49 having a constant hexagonal cross section. Upper and lower fiber holding arrangements 51 and 52 are slidably engaged on the respective mandrel extensions. The upper fiber holding arrangement 51 has a cylindrical sleeve member 54 with inner dimensions capable of slidably receiving the larger central portion of the mandrel 46 to permit free sliding vertical movement of the sleeve. The upper end of the cylindrical sleeve 54 is partially closed with a hexagonal aperture defined therein that slidably receives the upper mandrel extension 48. A number of leaf spring contacts 58 are attached at one end to the closed end of the sleeve 54 by screws or welding or the like. Each has its free end bearing against one of the flat vertical sides on the hexagonal mandrel extension 48 to provide a frictional restraint against movement of the sleeve.

The fiber ends are held at the lower end of the sleeve 54 in two concentric bundles uniformly distributed about the circumference. The means employed for holding the fibers in place about the lower end of the sleeve 54 may take any suitable form including the relatively simple arrangement illustrated herein. As best seen in FIG. 3, the upper ends of an inner bundle of fibers 60 are distributed about the circumference of the cylindrical sleeve 54 to be held tightly against it by a flexible inner metal band 64. In the particular arrangement shown, the inner metal band 64 contains an elongated slotted groove at one end into which the other end is inserted to be held by friction. The inner surface of the flexible band 64 contains spaced protrusions or spikes 66 that extend radially inwardly to maintain the position of the fibers in the bundle relative to one another against circumferential slippage. Likewise, the outer bundle fibers is distributed about the sleeve 54 along the outer surface of the inner band 64 and are held in place by a flexible metal band 68 that also contains inner protrusions or spikes 70 for preventing circumferential slippage of the fiber ends. The opposite ends of the outer band 60 are joined with a positive closure means, such as the conventional nut and bolt clamp 72 shown in FIG. 3. After the inner and outer fiber bundles 60 and 62 have been properly arranged relative to one another, the clamping screw device 72 is tightened to exert additional clamping force on both the inner and outer fiber bundles. The slotted groove end closure of the inner band 64 allows further reduction of the band diameter so that the increased clamping force exerted by the outer band 60 is transmitted to the inner fiber bundle.

The inner fiber bundle 60 is dispensed from a bobbin (not shown) to be uniformly distributed about the central mandrel 46 with the individual fibers extending in a straight vertical line parallel to the spin axis so that the lower ends can be clamped in place in the lower clamping assembly 52 about the lower mandrel extension 49. This assembly, as shown in FIG. 4, contains a circular inner disk 74 with a central hexagonally-shaped aperture slidably engaging the lower mandrel extension 49. A flexible metal inner band 76 having the slotted groove end closure holds the lower ends of the inner bundle of fibers in place against the outer circumference of the disk 74. With the lower ends of the fibers in the inner bundle clamped in place by the band 76, the upper ends are distributed about the sleeve 51 and clamped in place with the band 64. The band 76 holding the lower end of the fibers is moved upwardly to permit the top of the sleeve 54 to be lifted above the upper mandrel extension 48. With the band 76 held against rotation, the upper band 64 can be rotated to give the inner fiber bundle 66 the desired amount of twist, after which the sleeve 54 is replaced to receive the mandrel extension 48 in its hexagonal aperture to prevent rotation therebetween. The lower ends of the fibers in the outer bundle 62 are then clamped tightly in place with the outer band 78 using the nut and bolt type closure. The upper ends of the outer bundle 62 are first clamped loosely with the outer band 68 and rotated about the mandrel to give the desired opposite twist to the outer bundle.

The central section of the mandrel 46 has both an upper and lower series of nozzle holes 80 and 82 arranged about the mandrel periphery just within the upper and lower openings in the mold 40 for releasing a liquid binder to coat the fibers and bind them together when hardened to form the fiber reinforced body. The number and placement on the nozzle holes along the mandrel depends upon the particular shape of the body to be produced, which determines the flow path of the liquid released during spinning.

As shown in FIG. 2, the upper series of nozzle holes 80 is supplied with liquid binder 84 contained in a hollow reservoir chamber 86 defined within the interior of the mandrel 46. The reservoir 86 is replenished before each operation by filling through an access passage 88 that extends along the spin axis through the upper mandrel extension 48 to emerge through an opening at the top. A similar liquid reservoir chamber (not shown) for supplying the lower nozzle openings 82 located in the lower portion of the mandrel may be filled through an access passage that emerges to form the port 90 along the outer surface of the mandrel 46. The lower access passage (not shown), like the upper passage 88, should enter the reservoir chamber along the spin axis to prevent escape of the liquid binder through the port 90 due to centrifugal force.

Release of the binder through the nozzle holes 80 and 82 is delayed until the fibers are properly disposed along the interior surfaces of the mold 40. This may be accomplished by an appropriate means, such as a spring loaded valve arrangement shown in FIG. 2, which has a weighted piston 92 slidably engaged for reciprocating movement in a radially extending cylinder opening formed in the mandrel 46. The weighted piston 92 is spring biased to a closed position (as shown) which seals an outlet passage from the bottom of the reservoir chamber 86 through which the liquid binder is distributed to the individual nozzle openings 80. In the closed position, the weighted piston 92 has its center of gravity radially displaced from the spin axis so that during spinning the centrifugal force tends to move the piston 92 radially outward in the cylinder against the spring force. This valve arrangement may be designed so that the centrifugal force on the piston 92 is insufficient to overcome the spring bias until a predetermined spin rate is exceeded, that is in excess of that necessary to slide the upper and lower fiber holding arrangements 51 and 52 together to distribute the fibers against the interior walls of the mold 40. The spin rate can thus be maintained below this predetermined rate until the fibers are in position, and then increased to open the spring loaded valve arrangement so that the liquid binder 84 is released through the nozzle holes 80.

After release from the upper and lower nozzle openings 80 and 82 the liquid binder is directed radially outward by centrifugal force toward the surrounding interior mold walls and the fibers that lie against it. Excess liquid binder that is not trapped between the fibers flows from the areas immediately surrounding the nozzle openings 80 and 82 over the curved mold surfaces toward areas of greater radial displacement. Excess fluid not trapped between the fibers as it moves over the interior mold surface will accumulate at the outer diameter of the mold to produce a finished article in which the wall thickness is much greater where the diameter is greatest. Although this may be a desirable result in some instances, this effect can be prevented or effectively controlled by use of a mold 40 having spaced vent openings 84 along the interior walls to allow the release of excess liquid binder. The size and/or spacing of the vent openings 84 can be varied in proportion to the radial displacement of the mold walls from the spin axis with larger holes and smaller spacings between holes being used in areas where the mold wall is furthest displaced from the spin axis.

After the desired amount of liquid binder is released and has flowed over the interior mold surfaces to thoroughly coat the fibers, the spin rate may be reduced during the period required for the liquid binder to harden sufficiently to hold the fibers in place. After the liquid binder has hardened, the resulting fiber reinforced structure is removed from the interior of the mold 40, which of course is capable of being disassembled to permit removal of the rounded shape. The material used for the mold structure 40 is selected so that the hardened liquid binder will not adhere to the interior mold surfaces. For example, using a liquid binder such as epoxy resin, the mold, or at least its interior surfaces, should have a polytetrafluoroethylene coating which resists binding. After removal from the mold, the fiber reinforced article is finished by cutting away the loose fiber ends and smoothing or laminating the rough and irregular portions around the top and bottom openings.

Referring now to FIGS. 5 and 6, it is frequently desirable to produce a hollow article that has one or more holes or ports through the side walls at a desired location. In that case, a mold structure 86 is employed containing, or having attached thereto, a projection 87 having a pointed or tapered tip extending radially inward from the interior mold wall. The base of the projection 87 intersects the regular interior surface of the mold 86 to define the shape and size of the desired hole 88 in the wall 89 of the finished article. Preferably, the projection 87 is formed by indentation of the mold wall 86, rather than by the addition of a projection to the existing mold structure, in order to avoid an unsymmetrical mass distribution that could cause a troublesome centrifugal force imbalance at high spin rates.

In operation, as the fibers bow outward towards the interior mold walls, they initially reach the tapered tip of the projection 87. The tip of the projection 87 penetrates between the outwardly expanding fibers moving the fibers to either side as they approach the interior mold walls. As shown in FIG. 7, where there is a cross fiber orientation, the fully extended fibers lie against the interior mold surface around the base of the projection 87 so that the hole 88 formed in the wall 89 of the finished article has an increased fiber concentration about the periphery of the hole that increases the structural strength where needed in the area of surface discontinuity about the hole, as shown by the lines 90 in FIG. 7 that represent the fiber orientation in that portion of the article.

Referring now to FIG. 7, the method of the invention may be employed in the manufacture of various shaped articles with minor modifications in the equipment that is specially adapted for the particular shape being formed. For example, a mold 92 defines the shape of a hollow article that might be used as a mortar base plate where the radial dimensions substantially exceed the axial dimensions. In these cases, the fibers 94 are relatively long so that when extending vertically about the mandrel 96, most of the fiber length would be disposed outside of the mold structure. If the longer portions of the fibers 94 extending outside of the mold structure 92 are not restrained, they would bow outward even more than the portion of the fibers within the mold structure so that the greater centrifugal force on this portion of the fibers would prevent the fibers from being drawn into the mold structure 92 during spinning. However, this problem is obviated by simply restraining outward movement of the fibers, except for the portions within the mold structure 92.

In the particular arrangement shown in FIG. 7, an upward extension 97 of the mandrel 96 slidably engages an upper fiber holding collar 98. The outward radial movement of the upper portion of the fibers 94 extending above the top opening in the mold structure 92 are restrained by mounting of a cylindrical sleeve 99 around the upper mandrel extension 97. The sleeve 99 has an internal diameter greater than the collar 98 so as to permit free downward sliding movement of the upper collar 98 as the assembly is spun.

As shown in FIG. 7, it may be desirable with certain shapes to employ only a single slidable collar arrangement 98, preferably located above the mold structure so that its sliding movement is aided by the force of gravity. The other end of the fibers, in this case the bottom ends, are passed through a small diameter hole in the bottom of the mold to be held in a stationary clamping arrangement 100 located on the lower portion of the mandrel. In this arrangement, the bottom of the mold structure 92 contains an annular ring 102 that fits snugly within a central circular recess in the turntable 104 that holds the mold structure 92 firmly for high speed rotation with the turntable. The mandrel 96 has a thicker central portion containing nozzle holes 106 within the top opening of the mold structure 92 and bottom nozzle holes 108 directed downwardly against the flat bottom surface of the mold 92. A lower mandrel extension 110 extends through the small hole in the bottom of the mold structure 92 to engage a notched opening in the turntable 104 to be held against rotation relative to the turntable.

The method of this invention obviously is also useful in producing many other hollow symmetrically shaped objects having fiber reinforcements hardened in a liquid binder matrix, such as cylindrical pipe sections and the like. The method employed herein produces an improved cylindrical pipe section in comparison with other centrifugal production methods since the fiber alignment is controlled to produce a uniform distribution of the fibers along the length of the pipe section with the desired reinforcement alignment.

By proper selection of the liquid binder and fiber materials, the radial distribution and density of the fibers in the finished article can be carefully controlled by varying the spin rate during the hardening period. In some articles it may be desirable to have the fibers evenly distributed throughout the thickness of the article walls, whereas in other articles it may be desirable to have the fibers concentrated at the interior or exterior surfaces of the walls. When the fibers are immersed by the liquid binder, they are subjected to a force of buoyancy acting in the direction opposite of the resultant between the existing centrifugal force and gravity. Accordingly, if the material of the fibers has the same specific gravity as the liquid binder, the fibers have zero buoyancy and tend to remain evenly distributed through the thickness of the article walls. However, if the specific gravity of the fiber is greater than that of the liquid binder, the fibers have negative buoyancy and thus would tend to be concentrated toward the outer surfaces of the finished article. In that event, greater centrifugal forces resulting from higher spin rates could be used to increase the density of the fibers towards the outer wall surfaces. On the other hand, fibers having a lower specific gravity than the liquid binder, would exhibit positive buoyancy and would tend to float inward thus concentrating on the inner surfaces of the finished article when the binder dries. The fiber density on the inner surfaces is thus also increased with higher spin rates which increase the force of buoyancy tending to move the fibers inward.

What is claimed is:
1. A method of forming a hollow fiber reinforced body having a substantially axially symmetric shape comprising:
 uniformly distributing elongated fibers of a predetermined length about and extending axially along a spin axis;
 disposing a hollow mold having interior walls conforming to the substantially axially symmetric shape to surround said spin axis and an intermediate portion of said fibers;
 engaging the opposite ends of said fibers to extend along said spin axis to be slidably drawn along said spin axis into said mold;
 spinning said mold and said fibers to move said fibers within said mold outwardly by centrifugal force toward the interior walls, the centrifugal force produced on the intermediate portion of said fibers drawing additional portions into said mold until said fibers contact the interior walls of said mold;
 releasing a liquid binder about said spin axis to flow by centrifugal force over the interior walls of said mold to coat said fibers in contact therewith; and
 continuing said spinning for an additional time period until said binder has hardened to hold said fibers together to form said body.

2. The method of claim 1 wherein:
the step of engaging the opposite ends of said fibers comprises engaging said fibers to extend parallel to said spin axis.

3. The method of claim 2 wherein:
the step of engaging the opposite ends of said fibers comprises engaging said fibers to extend in a helical twist about said spin axis.

4. The method of claim 1 wherein:
the step of engaging the opposite ends of said fibers includes the steps of engaging a first uniformly distributed portion of said fibers to extend in a helical twist about said spin axis in a first direction, and engaging a second uniformly distributed portion of said fibers concentrically with the first number of fibers to extend in a helical twist about said spin axis in the opposite direction.

5. The method of claim 1 wherein:
the step of engaging said fibers at their opposite ends comprises fixedly engaging one end of said fibers in a stationary position adjacent one end of said hollow mold and slidably engaging the other end of said fibers to extend along said spin axis at points external to the other end of said mold to be slidably drawn along said spin axis into said mold.

6. The method of claim 1 wherein:
the step of releasing a liquid binder comprises releasing a liquid binder having a specific gravity different from that of said fibers; and
the step of continuing said spinning comprises spinning said mold and said fibers at a predetermined rate for said additional time period to control the radial position and density of fibers within said binder.

References Cited
UNITED STATES PATENTS 3,200,180   8/1965   Russ et al.   264—311
3,283,714   11/1966   Carpenter et al.   264—311

ROBERT F. WHITE, Primary Examiner

G. AUVILLE, Assistant Examiner

U.S. Cl. X.R.

18—26